(12) United States Patent
Sharpe

(10) Patent No.: US 7,411,496 B2
(45) Date of Patent: Aug. 12, 2008

(54) SELF-CONTAINED CELLULAR SECURITY SYSTEM

(76) Inventor: Jon B. Sharpe, 5218 Pleasant Ridge Rd., Knoxville, TN (US) 37912

( * ) Notice: Subject to any disclaimer, the term of this patent is extended or adjusted under 35 U.S.C. 154(b) by 217 days.

(21) Appl. No.: 11/251,020

(22) Filed: Oct. 14, 2005

(65) Prior Publication Data

US 2007/0085674 A1 Apr. 19, 2007

(51) Int. Cl.
*G08B 21/00* (2006.01)
*G08B 9/00* (2006.01)

(52) U.S. Cl. .................. 340/540; 340/541; 340/539.11; 340/539.14; 340/539.22; 340/286.02; 340/286.05; 340/286.06; 340/286.11

(58) Field of Classification Search ................. None
See application file for complete search history.

(56) References Cited

U.S. PATENT DOCUMENTS

| | | | |
|---|---|---|---|
| 4,662,540 A * | 5/1987 | Schroter ....................... 222/55 |
| 5,463,371 A | 10/1995 | Fuller |
| 5,463,595 A | 10/1995 | Rodhall et al. |
| 5,923,248 A | 7/1999 | Toledano et al. |
| 6,154,130 A | 11/2000 | Mondejar et al. |
| 6,181,244 B1 | 1/2001 | Hall et al. |
| 6,278,884 B1 | 8/2001 | Kim |
| 6,329,930 B1 * | 12/2001 | Parsadayan ................. 340/933 |
| 6,433,683 B1 | 8/2002 | Robinson |
| 6,441,731 B1 | 8/2002 | Hess |
| 6,577,234 B1 | 6/2003 | Dohrmann |
| 6,828,909 B2 | 12/2004 | Script et al. |
| 6,833,788 B1 | 12/2004 | Smith et al. |
| 2003/0069716 A1 | 4/2003 | Martinez |
| 2003/0104800 A1 | 6/2003 | Zak |
| 2003/0227377 A1 | 12/2003 | Cardenas |
| 2004/0113778 A1 | 6/2004 | Script et al. |
| 2005/0030174 A1 | 2/2005 | Hess |
| 2005/0231354 A1 * | 10/2005 | Riedel et al. ................. 340/531 |

FOREIGN PATENT DOCUMENTS

| | | |
|---|---|---|
| DE | 4329571 | 3/1994 |
| DE | 10217717 | 7/2003 |
| JP | 1297363 | 11/1989 |

* cited by examiner

*Primary Examiner*—Julie Lieu
(74) *Attorney, Agent, or Firm*—Pitts & Brittian, P.C.

(57) ABSTRACT

Described is a cellular security system for monitoring an asset from a remote monitoring site without utilizing a signal modulating device or a cellular voice service. The cellular security system includes a detector, a display device, a cellular telephone that includes a camera and email capabilities, and a remote email device. When the detector detects an occurrence, the display device is activated such that the display device indicates the status of the detector. The cellular telephone captures a photo-image of the activated display device and composes an email and attaches the captured photo-image to the email. The cellular telephone sends the email to a remote email device, which is located at the remote monitoring site. From the remote monitoring site, the photo-image is viewed using the remote email device such that the status of the detector of the cellular security system is revealed.

26 Claims, 7 Drawing Sheets

SELF-CONTAINED CELLULAR SECURITY SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a security system for monitoring a designated asset. More particularly, this invention pertains to a self-contained security system for monitoring a designated asset from a remote monitoring site without implementing a signal modulating device or utilizing a cellular voice service.

2. Description of the Related Art

For obvious reasons, those with an interest in a business, a home, an apparatus, or an article desire to protect the object of that interest from fire, water, weather, thieves, vandals, or anything else that may jeopardize the value of the asset. Typically, security systems equipped with appropriate sensors and detectors, such as smoke detectors, motion detectors, switch sensors, perimeter sensors, and water sensors, provide protection for valuable assets. Certain conventional security systems provide protection by activating an alarm when a detector detects an occurrence, such as when a smoke detector detects smoke. The alarm, typically audible or visual, is designed to notify those in the proximate vicinity of an occurrence and to frighten away a potential thief or vandal. However, when a security system of this type is employed in a remote area, the audible and visual alarms are not effective because no one is in the proximate vicinity to respond to the alarm. Additionally, those employing a security system for protecting a valuable asset typically desire protection beyond that offered by the aforementioned type of security system. More specifically, those employing a security system desire a feature that permits the user to monitor the protected asset and the status of the security system from a remote location. For example, when the smoke detector detects smoke, the remote monitoring feature notifies a designated entity at a remote monitoring site. Remote monitoring sites include police stations, fire stations, the headquarters of a private security service provider, the security system user's home, or even a portable device in communication with the security system.

Those employing a security system also desire a security system that is self-contained. A self-contained security system provides protection without requiring an external power source, such as a standard power outlet, or an external means for communication, such as a standard telephone jack or a standard coaxial cable jack. Because a self-contained security system does not require external support, a self-contained security system is wireless, portable, and not limited by the location of employment.

Conventional security systems that are self-contained and provide a remote monitoring feature typically use cellular telephones to communicate information derived from the sensors and detectors of the security system to a remote monitoring site. First, a conventional security system gathers information from the employed sensors and detectors. Then, if the sensors and detectors are analog devices, the conventional security system converts the information from analog to digital. Next, the conventional security system modulates the information to a format that is compatible with standard telephone-line communication. Then, using the cellular telephone, the conventional security system dials the telephone number corresponding to the remote monitoring site. When a connection is established between the cellular telephone and the remote monitoring site, the conventional security system transmits the modulated information utilizing standard telephone communication. After the transmitted information is received at the remote monitoring site, the information is demodulated to a format that is compatible with a processing device, such as a computer. Finally, the information is displayed at the remote monitoring site such that appropriate action is taken.

Conventional self-contained security systems with a remote monitoring feature are limited in that the transmitted information must be modulated and demodulated. To modulate and demodulate the information, the conventional security system must include an analog-to-digital converter, a modem at the monitored site, a telephone number dialer, a cellular voice service for the cellular telephone, and a modem at the remote monitoring site.

BRIEF SUMMARY OF THE INVENTION

In accordance with the various features of the present invention there is provided a cellular security system for monitoring an asset and the status of various sensors and detectors from a remote monitoring site without utilizing a signal modulating device or a cellular voice service. The cellular security system includes an array of sensors and detectors, a processing device, a display device, a cellular telephone, and a remote email device. The array of sensors and detectors includes, for example, a motion detector, a smoke detector, and a tamper detector. The detectors are in communication with the processing device such that when there is an occurrence, such as movement detected by the motion detector, the detecting detector communicates the occurrence to the processing device, which is in communication with the display device. The display device includes, for example, an arrangement of LEDs, where each LED corresponds to a particular sensor or detector of the array. When the processing device recognizes an occurrence, the processing device activates the LED that corresponds to the detector that detected the occurrence. The processing device is also in communication with the cellular telephone. The cellular telephone includes a photo-image and video capturing feature and an email communication feature. In other words, the cellular telephone is a conventional camera cell phone with email capabilities. The cellular telephone is disposed adjacent to the display device such that the display device and the monitored asset are in the field of view of the cellular telephone's camera. When the processing device activates the display device in response to recognizing an occurrence, the processing device activates the photo-image capturing feature of the cellular telephone such that the cellular telephone creates a photo-image of the activated display device and the monitored asset. The processing device then causes the cellular telephone to compose an email and to attach the photo-image to the email. Next, the processing device causes the cellular telephone to send the email to a designated email account. Because the photo-image of the monitored asset and the status of the detectors are transmitted by way of an internationally or universally recognized format such as an email, no modem or cellular voice service is required. The designated email account is monitored using the remote email device, which is located at the remote monitoring site. When the email arrives at the designated email account, the attached photo-image is viewed using the remote email device. The photo-image communicates the status of the monitored asset and the status of array of sensors and detectors of the cellular security system to those at the remote monitoring site.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
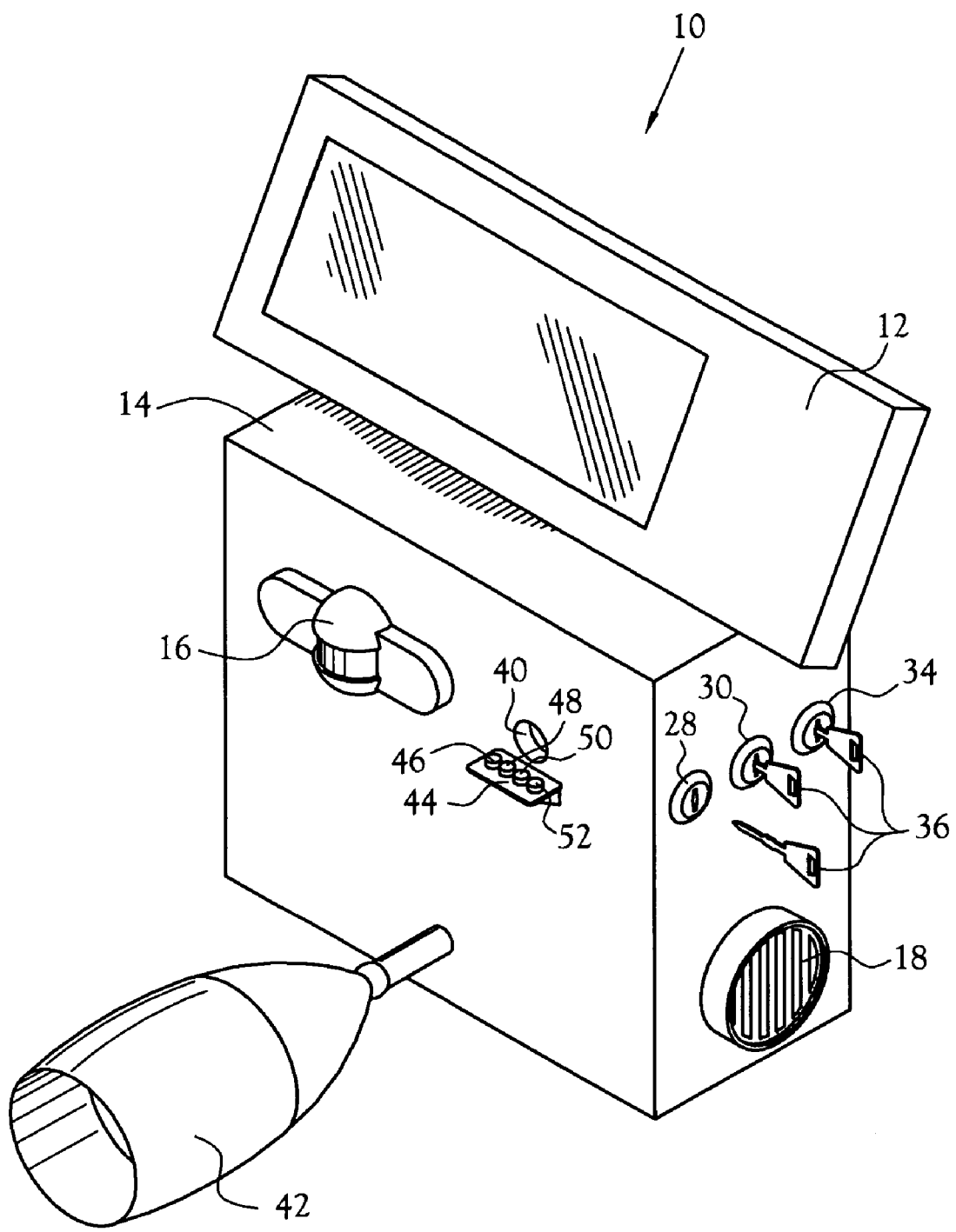
FIG. 1 is a perspective view of the cellular security system illustrating various features of the present invention.

One embodiment of a cellular security system for monitoring an asset and the status of various sensors and detectors from a remote monitoring site without utilizing a signal modulating device or a cellular voice service and constructed in accordance with the various features of the present invention is illustrated generally at 10 in FIG. 1. The cellular security system 10 includes an array of sensors and detectors, a processing device, a display device, a cellular telephone, and a remote email device. The array of sensors and detectors includes, for example, a motion detector, a smoke detector, and a tamper detector. The detectors are in communication with the processing device such that when there is an occurrence, such as movement detected by the motion detector, the detecting. detector communicates the occurrence to the processing device, which is in communication with the display device. The display device includes, for example, an arrangement of LEDs, where each LED corresponds to a particular sensor or detector of the array. When the processing device recognizes an occurrence, the processing device activates the LED that corresponds to the detector that detected the occurrence. The processing device is also in communication with the cellular telephone. The cellular telephone includes a photo-image capturing feature and an email communication feature. In other words, the cellular telephone is a conventional camera cell phone with email capabilities. The cellular telephone is disposed adjacent to the display device such that the display device and the monitored asset are in the field of view of the cellular telephone's camera. When the processing device activates the display device in response to recognizing an occurrence, the processing device activates the photo-image capturing feature of the cellular telephone such that the cellular telephone creates a photo-image of the activated display device and the monitored asset. The processing device then causes the cellular telephone to compose an email and to attach the photo-image to the email. Next, the processing device causes the cellular telephone to send the email to a designated email account. Because the photo-image of the monitored asset and the status of the detectors are transmitted by way of an email, no modem or cellular voice service is required. The designated email account is monitored using the remote email device, which is located at the remote monitoring site. When the email arrives at the designated email account, the attached photo-image is viewed using the remote email device. The photo-image communicates the status of the monitored asset and the status of array of sensors and detectors of the cellular security system 10 to those at the remote monitoring site.

Figure 2:
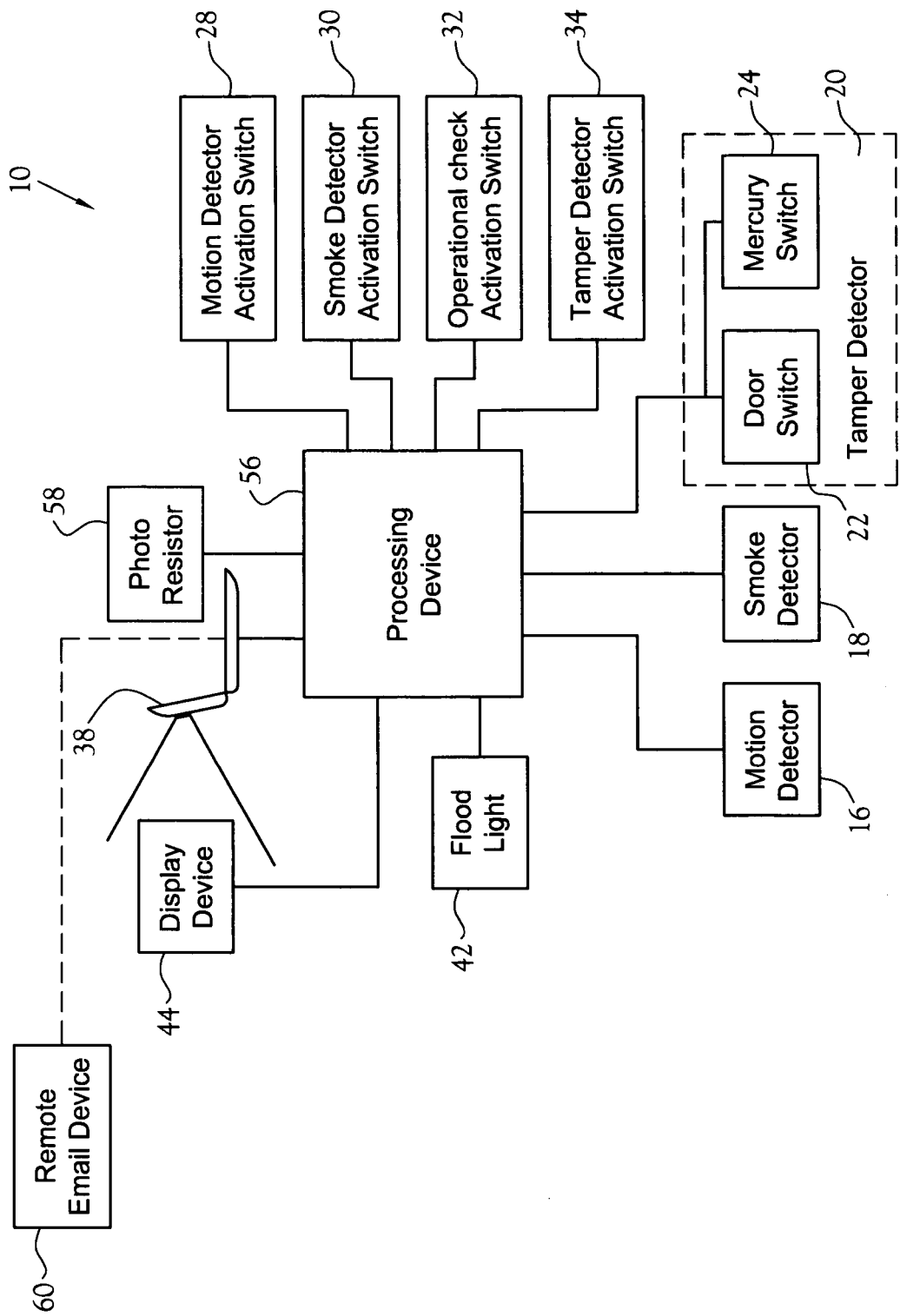
FIG. 2 is a block diagram illustrating the interconnection of various parts of the cellular security system of FIG. 1.

FIG. 1 illustrates the cellular security system 10 in accordance with various features of the present invention. FIG. 2 is a block diagram of the cellular security system 10 illustrating the interconnection of various components of the present invention. Considering FIG. 1 and FIG. 2 concurrently, the various features of the present invention become clearly understood. As shown in FIG. 1, the cellular security system 10 of the illustrated embodiment includes a solar panel 12 and a cabinet 14. The cabinet 14 is constructed of a substantially sturdy material, such as stainless steal, so that the cabinet 14 withstands harsh environmental elements or an attempted forced entry or destruction by an intruder. The solar panel 12 is disposed at the exterior of the cabinet 14 such that the solar panel 12 collects solar energy. The solar panel 12 provides the cellular security system 10 with power for operation. Additionally, the cellular security system 10 includes a power source other than the solar panel 12, such as a battery. The power source is disposed within the cabinet 14 and provides the cellular security system 10 with power for operation. The cellular security system 10 is adapted to utilize power generated by the solar panel 12 when such power is available and sufficient, and to utilize power generated by the power source otherwise. Consequently, the cellular security system 10 is self-contained in that it operates without the use of an external power source such as a standard electrical outlet. Additionally, the cellular security system 10 of the illustrated embodiment is power efficient in that it utilizes solar energy when feasible.

Those skilled in the art will recognize that the cellular security system 10 can include only the power source, and not the solar panel 12, without departing from the scope or spirit of the present invention. Additionally, those skilled in the art will recognize that the cellular security system 10 can be adapted to utilize power from a standard electrical outlet when available, and utilize power from the power source or the solar panel 12 otherwise without departing from the scope or spirit of the present invention.

The cellular security system 10 includes an array of sensors and detectors. In the illustrated embodiment, the array includes a motion detector 16, a smoke detector 18, and a tamper detector 20. The motion detector 16 is disposed at the exterior of the cabinet 14 and is in electrical communication with a processing device 56. The motion detector 16 is responsive to movement occurring within the field of view of the motion detector 16. The smoke detector 18 is also disposed at the exterior of the cabinet 14 and is also in electrical communication with the processing device 56. The smoke detector 18 is responsive to smoke, or more specifically, is responsive to a change in opacity. The tamper detector 20 is disposed within the cabinet 14, is in electrical communication with the processing device 56, and includes a door switch 22 and a mercury switch 24. The door switch 22 is responsive to the opening of the cabinet 14 door. The mercury switch 24 is responsive to physical movement or agitation of the cabinet 14.

Those skilled in the art will recognize that sensors and detectors other than the motion detector 16, the smoke detector 18, and the tamper detector 20 can be used without departing from the scope or spirit of the present invention. Those skilled in the art will also recognize that the motion detector 16, the smoke detector 18, and the tamper detector 20 can be in electrical communication with the processing device 56 or in wireless communication with the processing device 56 without departing from the scope or spirit of the present invention. For example, the cellular security system 10 may include a closet door switch that is responsive to the opening of a closet door that is monitored by the cellular security system 10. To avoid having wires running between the cabinet 14 and the monitored door, the door switch would be in wireless communication with the processing device 56 by way of a receiver that is in electrical communication with the processin device 56.

The cellular security system 10 includes a motion detector activation switch 28, a smoke detector activation switch 30, a tamper detector activation switch 34, and an operational check activation switch 32, in conjunction with a subsequently discussed photo resistor 58. The motion detector activation switch 28, the smoke detector activation switch 30, and the tamper detector activation switch 34 are disposed at the exterior of the cabinet 14, are in electrical communication with the processing device 56, and, in the illustrated embodiment, are rotational switches adapted to rotate only when cooperating with the corresponding keys 36. The rotational position of the motion detector activation switch 28, the smoke detector activation switch 30, and the tamper detector activation switch 34 determines whether the motion detector 16, the smoke detector 18, and the tamper detector 20, respectively, are activated. Deactivating the motion detector activation switch 28 allows a user to perform authorized activities in the field of view of the motion detector 16, without triggering motion detector 16. Deactivating both the motion detector activation switch 28 and the tamper detector activation switch 34 allows a user to maintain the security system 10, including the opening or moving of the cabinet 14, without triggering the motion detector 16 or the tamper detector 20. Deactivating the motion detector activation switch 28, the tamper detector activation switch 34, and the operational check activation switch 32 allows a user to further maintain the security system 10, including programming the cellular telephone 38, such as changing the address of the subsequently discussed remote email device 60, without triggering the motion detector 16, the tamper detector 20, or the photo resistor 58.

Those skilled in the art will recognize that the activation switches can be switches other than rotational switches with corresponding keys without departing from the scope or spirit of the present invention. Further, those skilled in the art will recognize that the cellular security system 10 does not require the implementation of the activation switches to remain within the scope or spirit of the present invention.

The cellular security system 10 includes a cellular telephone 38. The cellular telephone 38 is disposed within the cabinet 14 and, in the illustrated embodiment, is in electrical communication with the processing device 56 such that the processing device 56 controls the standard operation of the cellular telephone 38. Those skilled in the art will recognize that the processing device 56 can be in communication with the cellular telephone 38 by way of an electro-mechanical keypad interface without departing from the scope or spirit of the present invention. When employed, the electro-mechanical keypad interface is in electrical communication with the processing device 56 and, under the direction of the processing device 56, mechanically presses the control buttons of the cellular telephone 38 as a human user does. As a result, the processing device 56 causes the cellular telephone 38 to, for example, compose and send an email by pressing, by way of the electro-mechanical keypad interface, the sequence of control buttons a human user does to compose and send an email.

The cellular telephone 38 is adapted to capture photo-imagery by way of an internal camera and is adapted to wirelessly communicate by way of email utilizing the Internet or other network. The cellular telephone 38 is disposed proximate to an opening 40 in the cabinet 14 such that the cellular telephone's 38 camera has a field of view that extends from within the cabinet 14, through the opening 40, and to the monitored asset. As a result, the cellular telephone 38 is capable of generating a photo-image of the monitored asset. Those skilled in the art will recognize that the cellular telephone's 38 camera is can generate photo-images including objects other than the monitored asset, such as the general area proximate to the cabinet 14, without departing from the scope or spirit of the present invention. To facilitate capturing the photo-image of the monitored asset, the cellular security system 10 includes a flood light 42. The flood light 42 is disposed at the exterior of the cabinet 14, is in electrical communication with the processing device 56, and is positioned to illuminate the field of view of the of the cellular telephone's 38 camera such that the cellular telephone 38 has sufficient lighting to generate a photo-image of sufficient quality.

The cellular telephone 38 is in email communication with a remote email device 60. The remote email device 60 includes any device capable of email communication, such as a computer, an email station, a portable email device, or even another cellular telephone with email capabilities. The remote email device 60 is located at a remote monitoring site, which is remote from the location of the cabinet 14. As previously discussed, the cellular telephone 38 sends emails to and receives emails from the remote email device 60. The cellular telephone 38 notifies the cellular security system 10 when the cellular telephone 38 receives an email by way of a photo-resistor 58, which is in electrical communication with the processing device 56. More specifically, the keypad of the cellular telephone 38, like other conventional cellular telephones, illuminates when the cellular telephone 38 receives an email. The photo-resistor 58 is sensitive to the illumination and is disposed proximate to the cellular telephone 38 such that when the keypad illuminates, the photo-resistor 58 responds. When the photo-resistor 58 responds to the illuminated keypad, the processing device 56 initiates a subsequently discussed series of programmed instructions. Those skilled in the art will recognize that a portion of the cellular telephone 38 other than the keypad may illuminate in when the cellular telephone 38 receives an email. Consequently, the photo-resistor 58 may respond to the illumination of a portion of the cellular telephone 38 other than the keypad without departing from the scope or spirit of the present invention.

The cellular security system 10 includes a display device 44. The display device 44 is in electrical communication with the processing device 56 and, in the illustrated embodiment, is a LED display that includes a first LED 46, a second LED 48, a third LED 50, and a fourth LED 52. In the illustrated embodiment, the first LED 46 corresponds to the motion detector 16, the second LED 48 corresponds to the smoke detector 18, the third LED 50 corresponds to the tamper detector 20, and the fourth LED 52 corresponds to the reception of an email by the cellular telephone 38. Those skilled in the art will recognize that the display device 44 can include indicators other than LEDs without departing from the scope or spirit of the present invention. Additionally, when the display device 44 includes an arrangement of LEDs, those skilled in the art will recognize that the number of employed LEDs can vary with the number of employed detectors without departing from the scope or spirit of the present.

Figure 3:
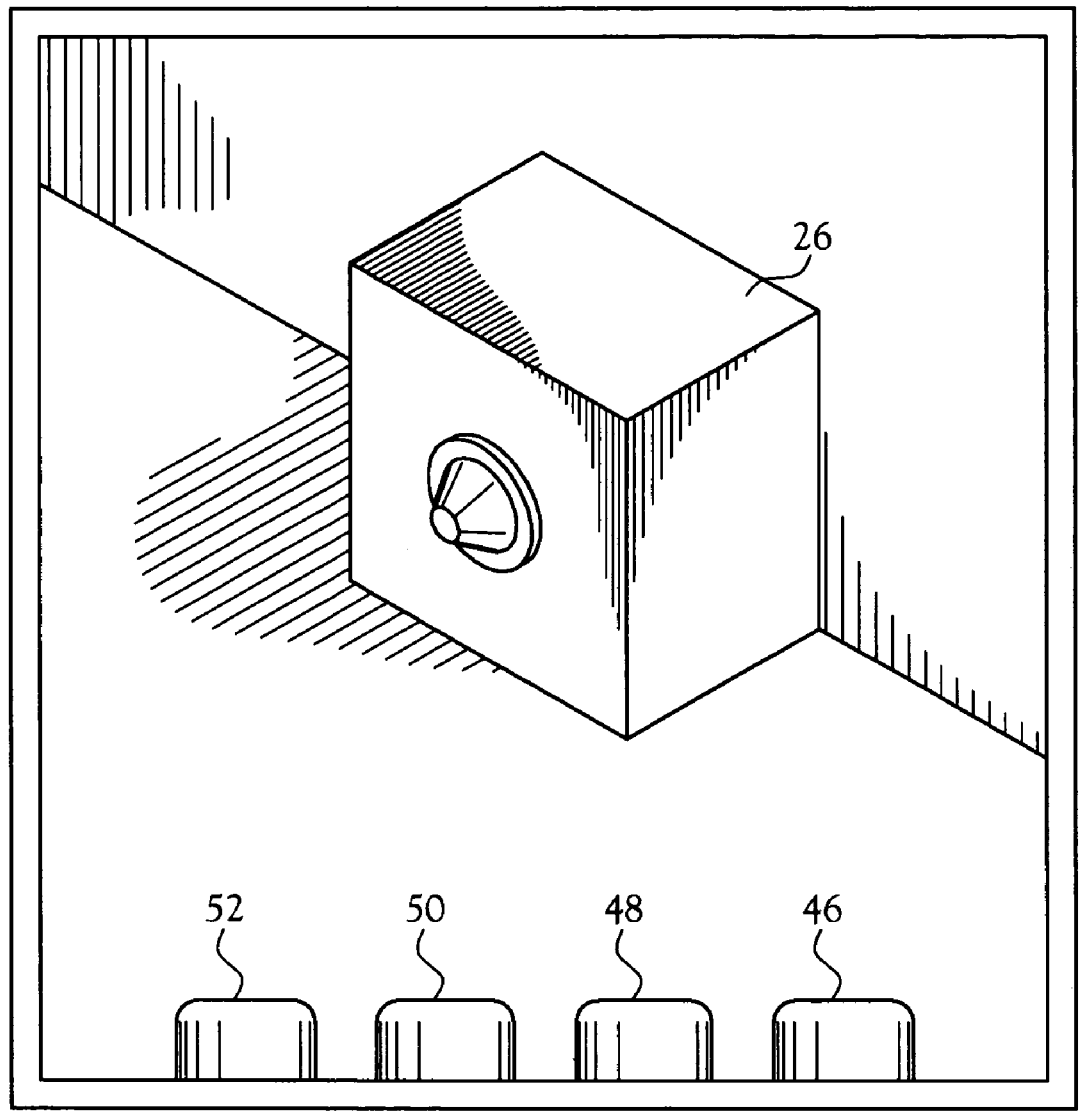
FIG. 3 is a photo-image captured by the cellular telephone of the cellular security system of FIG. 1.
Figure 4A:
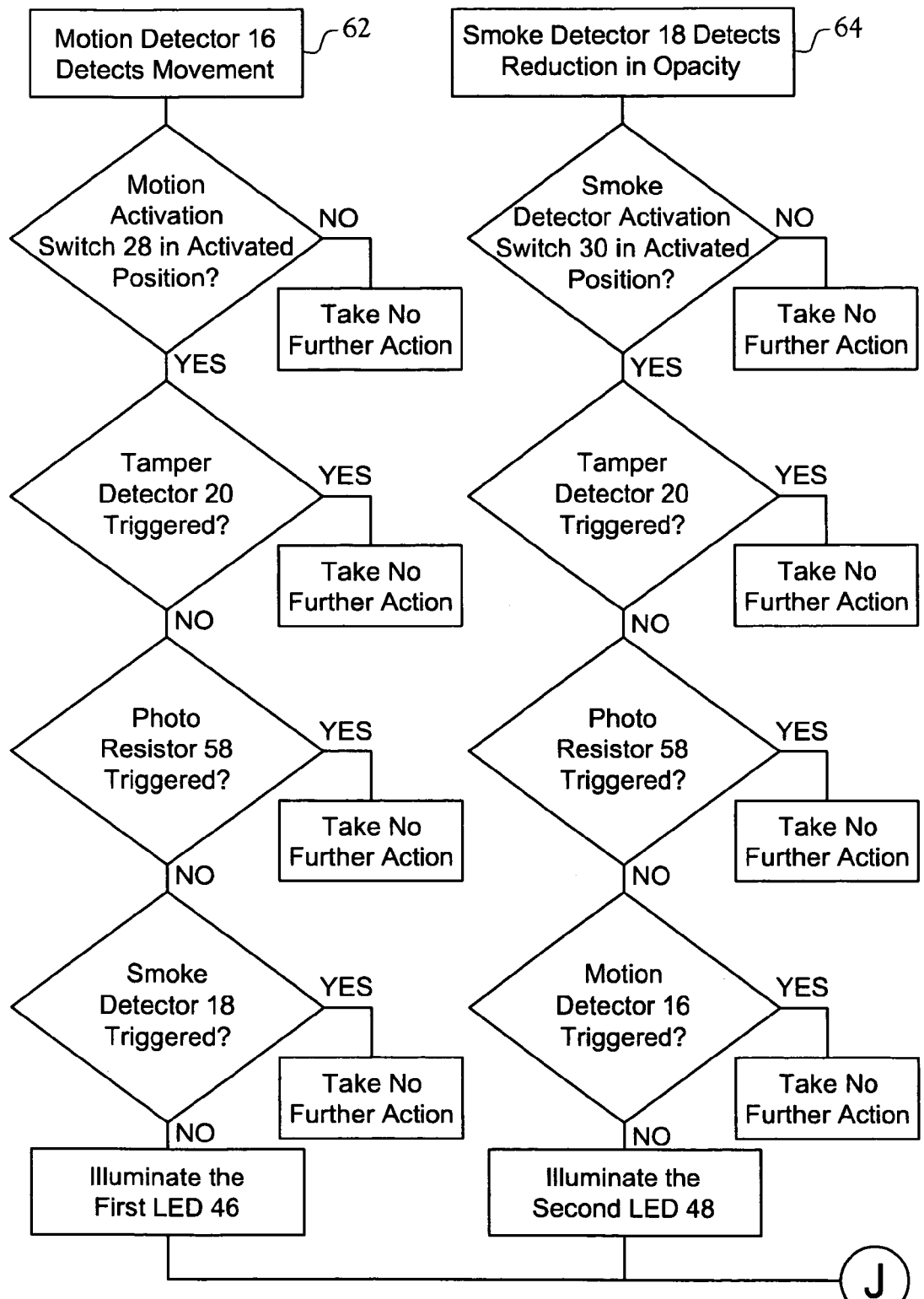
FIG. 4 is a flow diagram illustrating operational features of the cellular security system of FIG. 1.
Figure 4B:
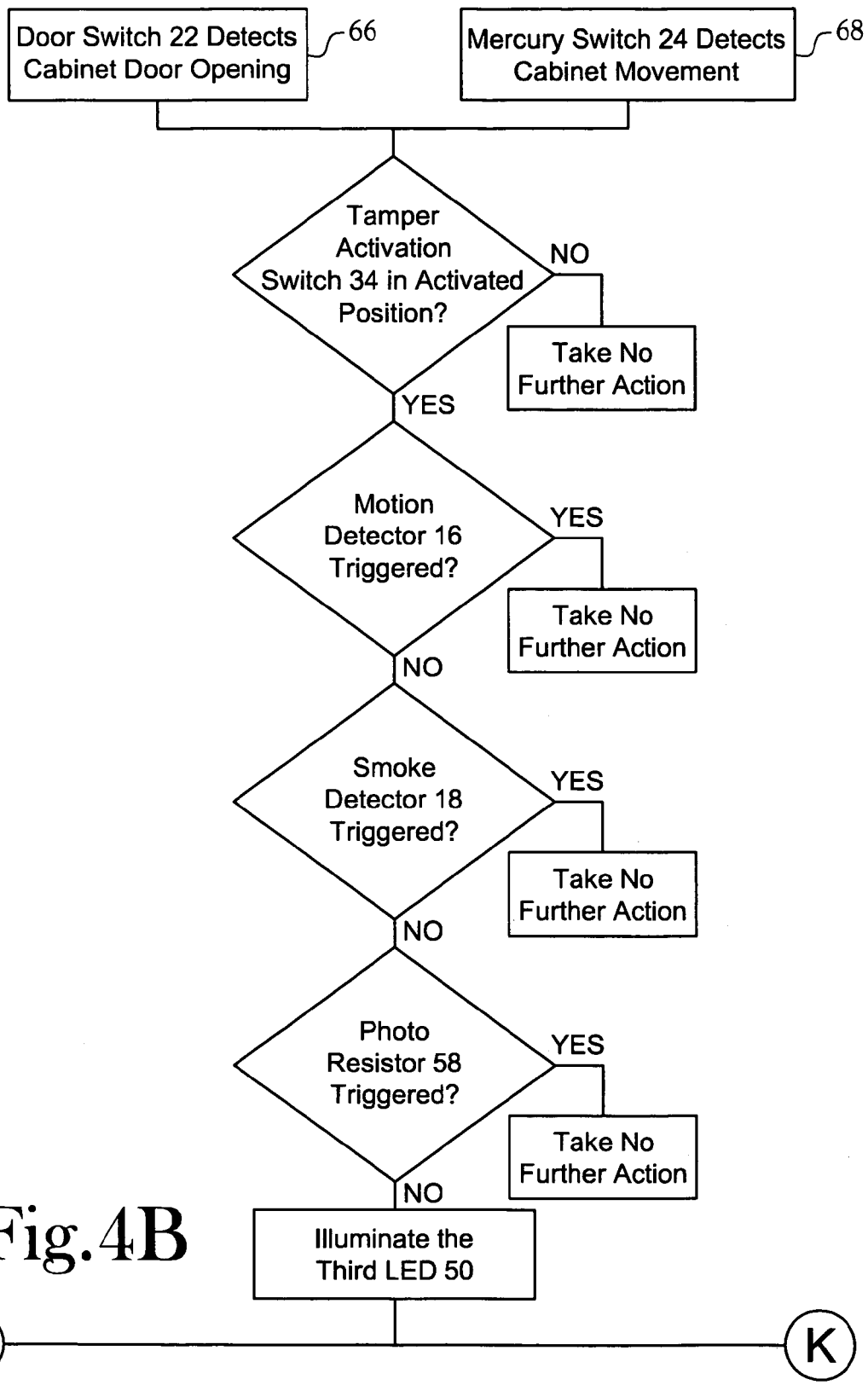
Figure 4C:
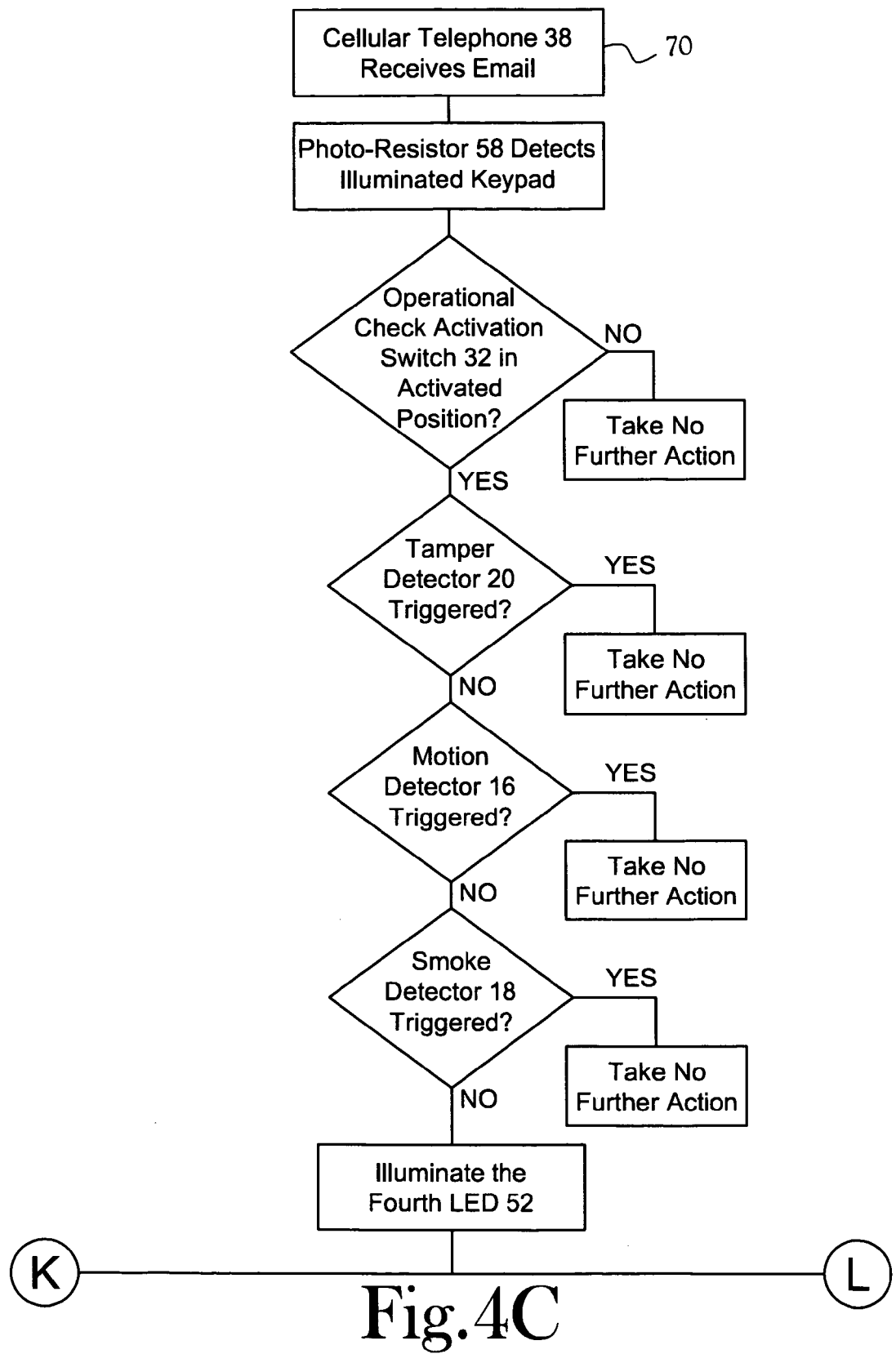
Figure 4D:
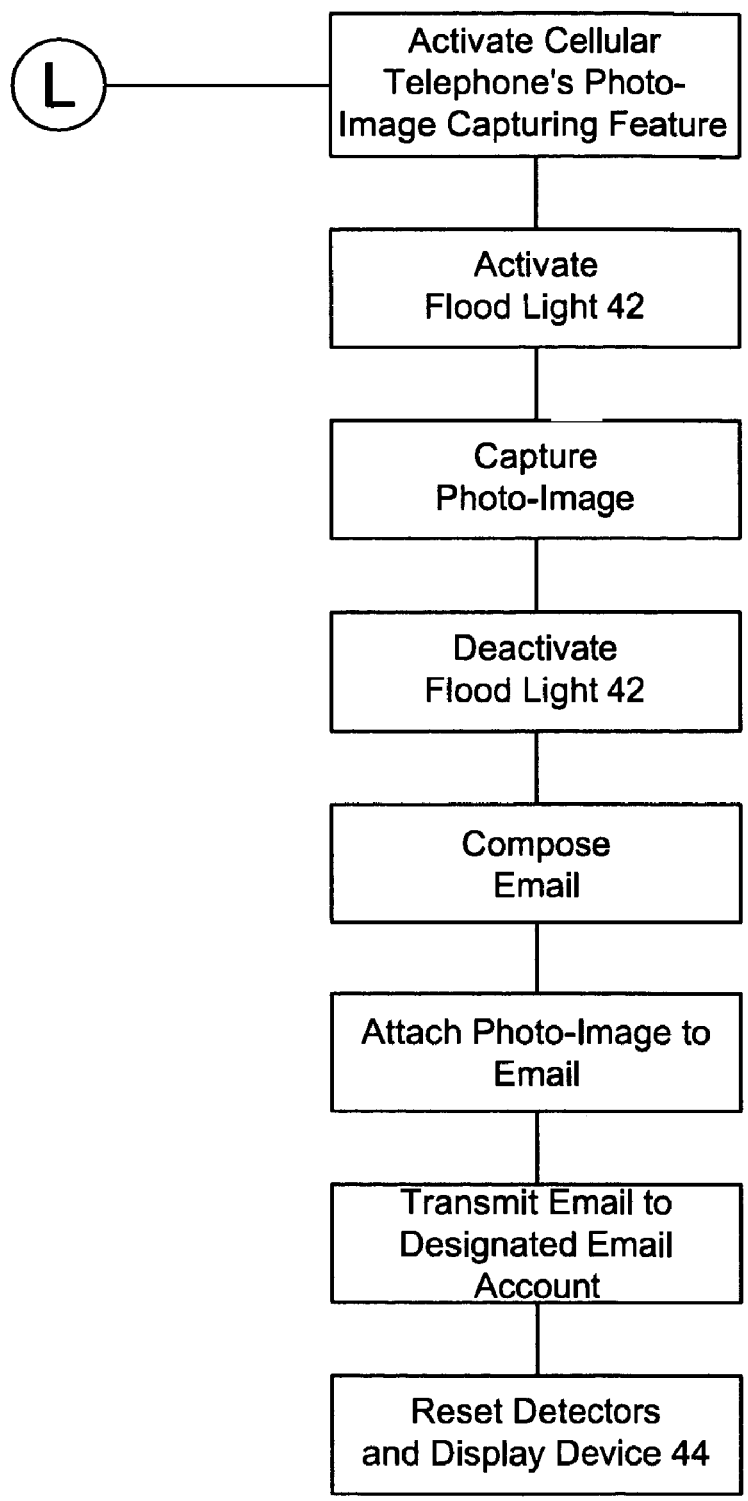

The display device 44 is disposed at the exterior of the cabinet 14 and adjacent to the opening 40 such that the display device 44, namely the first LED 46, the second LED 48, the third LED 50, and the fourth LED 52, is positioned within the field of view of the camera of the cellular telephone 38 to the extent that a photo-image captured by the cellular telephone 38 includes the display device 44. FIG. 3 illustrates an example of a photo-image captured by the cellular security system 10. In the illustrated photo-image, the asset being monitored is a combination safe 26. The photo-image includes the combination safe 26, the first LED 46, the second LED 48, the third LED 50, and the fourth LED 52.

Those skilled in the art will appreciate that the circuitry represented in FIG. 2 is not intended to show every component or interconnection. For example, power sources, supply lines, and regulation are omitted, but their use and implementation will be understood by those skilled in the art.

FIG. 4 is a flow diagram illustrating the operational features of the cellular security system 10. As previously discussed, the various detectors of the cellular security system 10 are sensitive to particular occurrences. More specifically, the motion detector 16 responds to movement 62, the smoke detector 18 responds to reduced opacity 64, the door switch 22 of the tamper detector 20 responds to the cabinet 14 door opening 66, and the mercury switch 24 of the tamper detector 20 responds to the cabinet 14 being moved 68. Additionally, the photo-resistor 58 responds to the cellular telephone 38 receiving an email 70. As represented in FIG. 4, when the motion detector 16 detects motion 62, the processing device 56 initially determines whether the motion detector activation switch 28 is in the activated position. The processing device 56 considers the position of the motion detection activation switch 28 to avoid producing a false alarm when, for example, an authorized individual, who is programming, maintaining, or cleaning the cellular security system 10, triggers the motion detector 16. If the processing device 56 determines that the motion detection activation switch 28 is not in the activated position, the processing device 56 takes no further action. However, if the processing device 56 determines that the motion detection activation switch 28 is in the activated position, the processing device 56 determines if the tamper detector 20 has been triggered. If the tamper detector 20 has been triggered, the processing device 56 takes no further action such that the series of programmed instructions resulting from the triggered tamper detector 20 are not interrupted. If the tamper detector 20 has not been triggered, the processing device 56 determines whether the photo resistor 58 has been triggered. If the photo resistor 58 has been triggered, the processing device 56 takes no further action such that the series of programmed instructions resulting from the triggered photo resistor 58 are not interrupted. If the photo resistor 58 has not been triggered, the processing device 56 determines whether the smoke detector 18 has been triggered. If the smoke detector 18 has been triggered, the processing device 56 takes no further action such that the series of programmed instructions resulting from the triggered smoke detector 18 are not interrupted. If the smoke detector 18 has not been triggered, the processing device 56 illuminates the first LED 46, which corresponds to the motion detector 16.

When the smoke detector 18 detects a reduction in opacity 64, as represented in FIG. 4, the processing device initially determines whether the smoke detector activation switch 30 is in the activated position. If the processing device 56 determines that the smoke detector activation switch 30 is not in the activated position, the processing device takes no further action. However, if the processing device 56 determines that the smoke detector activation switch 30 is in the activated position, the processing device 56 determines if the tamper detector 20 has been triggered. If the tamper detector 20 has been triggered, the processing device 56 takes no further action such that the series of programmed instructions resulting from the triggered tamper detector 20 are not interrupted. If the tamper detector 20 has not been triggered, the processing device 56 determines whether the photo resistor 58 has been triggered. If the photo resistor 58 has been triggered, the processing device 56 takes no further action such that the series of programmed instructions resulting from the triggered photo resistor 58 are not interrupted. If the photo resistor 58 has not been triggered, the processing device 56 determines whether the motion detector. 16 has been triggered. If the motion detector 16 has been triggered, the processing device 56 takes no further action such that the series of programmed instructions resulting from the triggered motion detector 16 are not interrupted. If the motion detector 16 has not been triggered, the processing device 56 illuminates the second LED 48, which corresponds to the smoke detector 18.

When the tamper detector 20 detects either the opening of the cabinet door 66 by way of the door switch 22 or the moving of the cabinet 68 by way of the mercury switch 24, the processing device 56 initially determines whether the tamper detector activation switch 34 is in the activated position. The processing device 56 considers the position of the tamper detector activation switch 34 to avoid producing a false alarm when, for example, an authorized individual, who is maintaining or moving the cellular security system 10, triggers the tamper detector 20. If the processing device 56 determines that the tamper detector activation switch 34 is not in the activated position, the processing device 56 takes no further action. However, if the processing device 56 determines that the tamper detector activation switch 34 is in the activated position, the processing device 56 determines if the motion detector 16 has been triggered. If the motion detector 16 has been triggered, the processing device 56 takes no further action such that the series of programmed instructions resulting from the triggered motion detector 16 are not interrupted. If the motion detector 16 has not been triggered, the processing device 56 determines whether the smoke detector 18 has been triggered. If the smoke detector 18 has been triggered, the processing device 56 takes no further action such that the series of programmed instructions resulting from the triggered smoke detector 18 are not interrupted. If the smoke detector 18 has not been triggered, the processing device 56 determines whether the photo resistor 58 has been triggered. If the photo resistor 58 has been triggered, the processing device 56 takes no further action such that the series of programmed instructions resulting from the triggered photo resistor 58 are not interrupted. If the photo resistor 58 has not been triggered, the processing device 56 illuminates the third LED 50, which corresponds to the tamper detector 20.

As previously discussed, when the cellular telephone 38 receives an email, the keypad of the cellular telephone 38 illuminates. When the keypad illuminates, the photo-resistor 58 responds as previously discussed and as represented in FIG. 4. When the photo resistor 58 detects the illuminated keypad, the processing device initially determines whether the operational check activation switch 32 is in the activated position. The processing device 56 considers the position of the operation check activation switch 32 to avoid producing a false alarm when, for example, an authorized individual, who is programming the cellular telephone 38 depresses a button on the keypad of the cellular telephone 38, causing the keypad to illuminate. If the processing device 56 determines that the operational check activation switch 32 is not in the activated position, the processing device takes no further action. However, if the processing device determines that the operational check activation switch 32 is in the activated position, the processing device 56 determines if the tamper detector 20 has been triggered.

If the tamper detector 20 has been triggered, the processing device 56 takes no further action such that the series of programmed instructions resulting from the triggered tamper detector 20 are not interrupted. If the tamper detector 20 has not been triggered, the processing device 56 determines whether the motion detector 16 has been triggered. If the motion detector 16 has been triggered, the processing device 56 takes no further action such that the series of programmed instructions resulting from the triggered motion detector 16 are not interrupted. If the motion detector 16 has not been triggered, the processing device 56 determines whether the smoke detector 18 has been triggered. If the smoke detector 18 has been triggered, the processing device 56 takes no further action such that the series of programmed instructions resulting from the triggered smoke detector 18 are not interrupted. If the smoke detector 18 has not been triggered, the processing device 56 illuminates the fourth LED 52, which corresponds to the cellular telephone 38 receiving an email.

As represented in FIG. 4, when the first LED 46, the second LED 48, the third LED 50, or the fourth LED 52 is illuminated, the processing device 56 activates the photo-image capturing feature of the cellular telephone 38. Next, the processing device 56 activates the flood light 42 to provide the cellular telephone's camera with sufficient lighting. Then the processing device 56 causes the cellular telephone 38 to capture a photo-image, or in other words, take a picture. As previously discussed, the photo-image includes the display device 44 and the monitored asset. After the cellular telephone 38 captures the photo-image, the processing device 56 deactivates the flood light 42. Next, the processing device 56 causes the cellular telephone 38 to compose an email and to attach the photo-image to the composed email. The processing device 56 then causes the cellular telephone 38 to send the email to a designated email account that is accessible by the remote email device 60.

Because the photo-image, which includes an image of the monitored asset and the status of the detectors, is transmitted by way of email, the cellular security system 10 does not require that the image of the monitored asset and the status of the detectors be modulated prior to transmission. Additionally, the cellular security system 10 does not require a cellular voice service, but merely requires a cellular data service. Because the information is not modulated prior to transmission, signals from analog sensors and detectors are not required to be converted from analog to digital. Also because the information is not modulated prior to transmission, demodulation is not required at the remote monitoring site. As a result, the cellular security system 10 permits the asset and the status of the detectors to be monitored from a remote monitoring site without the implementation of a modem, a cellular voice service, or an analog-to-digital converter.

After the email is sent to the designated email account, the email, including the attached photo-image, is viewed using the remote email device 60. As previously discussed, the captured photo-image includes the display device 44. Consequently, when the email is viewed using the remote email device 60, the status of the detectors of the cellular security system 10 is displayed through the photo-image of the display device 44. More specifically, when the motion detector 16 detects movement, the first LED 46 is illuminated. As a result, the photo-image, when viewed at the remote monitoring site, reveals that the motion detector 16 was triggered. Similarly, when the smoke detector 18 detects a reduction in opacity, the second LED 48 is illuminated. As a result, the photo-image, when viewed at the remote monitoring site, reveals that the smoke detector 18 was triggered. Also, when the tamper detector 20 detects that either the cabinet 14 door is opened or the cabinet 14 is moved, the third LED 50 is illuminated. As a result, the photo-image, when viewed at the remote monitoring site, reveals that the tamper detector 20 was triggered. Finally, when the photo-resistor 58 detects a received email by the cellular telephone 38, the fourth LED 52 is illuminated. As a result, the photo-image, when viewed at the remote monitoring site, reveals that neither the motion detector 16, the smoke detector 18, nor the tamper detector 20 have been triggered. Additionally, after the email is sent to the designated email account, the processing device 56 resets any triggered detectors and deactivates any illuminated LEDs.

Those skilled in the art will recognize that the flow diagram illustrated in FIG. 4 is merely an exemplary embodiment of the cellular security system 10. More specifically, the series of programmed instructions causing the activation of the display device 44 may vary without departing from the scope or spirit of the present invention. Additionally, the occurrences triggering the sensors and detectors may vary without departing from the scope or spirit of the present invention.

From the foregoing description, those skilled in the art will recognize that a security system for monitoring an asset from a remote monitoring site offering advantages over the prior art has been provided. The cellular security system provides remote monitoring of an asset without requiring the implementation of a modem or an analog-to-digital converter. Further, the cellular security system provides remote monitoring of an asset without requiring the implementation of a cellular voice service.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. A cellular security system for monitoring an asset from a remote monitoring site without implementing a modulating device or utilizing a cellular voice service, said security system comprising:
    a detector, said detector for detecting an occurrence;
    a display device, said display device in communication with said detector, said display device for indicating the status of said detector, said display device being activated when said detector detects an occurrence; and
    a cellular telephone, said cellular telephone in communication with said display device, said cellular telephone for capturing a photo-image of said display device when said display device is activated, said cellular telephone for emailing the photo-image to a designated email account when the photo-image is captured.

2. The cellular security system of claim 1 further comprising a remote email device, said remote email device in email communication with said cellular telephone, said remote email device located at the remote monitoring site, said remote email device for accessing the designated email account and for viewing the photo-image captured and emailed by said cellular telephone.

3. The cellular security system of claim 2 wherein said remote email device is a computer.

4. The cellular security system of claim 2 wherein said remote email device is a standard cell phone with email capabilities.

5. The cellular security system of claim 1 wherein said detector is a plurality of detectors.

6. The cellular security system of claim 1 or claim 5 wherein said detector is in wireless communication with said display device.

7. The cellular security system of claim 1 or claim 5 wherein said detector includes a motion detector.

8. The cellular security system of claim 1 or claim 5 wherein said detector includes a smoke detector.

9. The cellular security system of claim 1 or claim 5 wherein said detector includes a tamper detector.

10. The cellular security system of claim 5 wherein said display device is an arrangement of LEDs, whereby each LED of the arrangement corresponds to a detector of said plurality of detectors.

11. The cellular security system of claim 1 wherein said display device is an arrangement of LEDs.

12. The cellular security system of claim 1 wherein said cellular telephone is for capturing a photo-image of the monitored asset when capturing the photo-image of said display device such that the photo-image includes said display device and the monitored asset.

13. The cellular security system of claim 1 further comprising a detector activation switch, said detector activation switch for activating and deactivating said detector.

14. The cellular security system of claim 1 further comprising a solar panel, said solar panel for generating operational power for the cellular security system.

15. The cellular security system of claim 1 further comprising a battery, said battery for generating operational power for the cellular security system.

16. The cellular security system of claim 15 wherein the cellular security system is adapted to draw operational power from a standard electrical outlet.

17. The cellular security system of claim 1 further comprising a flood light, said flood light for generating sufficient lighting such the photo-image captured by said cellular telephone is of sufficient quality.

18. A cellular security system for monitoring an asset from a remote monitoring site without implementing a modulating device or utilizing a cellular voice service, said security system comprising:
  a processing device;
  at least one detector, said detector in communication with said processing device, said detector adapted to detect an occurrence and indicate the detection of the occurrence to said processing device;
  a display device, said display device in communication with said processing device, said display device adapted to activate when said detector indicates the detection of the occurrence to said processing device, said display device adapted to indicate the status of said detector;
  a cellular telephone, said cellular telephone in communication with said processing device, said cellular telephone adapted to capture a photo-image that includes said display device and the monitored asset, said cellular telephone adapted to capture the photo-image when said display device is activated, said cellular telephone adapted to email the photo-image to a designated email account when said cellular telephone captures the photo-image; and
  a remote email device, said remote email device in email communication with said cellular telephone, said remote email device located at the remote monitoring site, said remote email device adapted to access the designated email account such that when said cellular telephone emails the photo-image to the designated email account, said remote email device displays the photo-image at the remote monitoring site.

19. The cellular security system of claim 18 wherein said detector is in electrical communication with said processing device.

20. The cellular security system of claim 18 wherein said detector is in wireless communication with said processing device.

21. The cellular security system of claim 18 wherein said display device is an LED arrangement.

22. The cellular security system of claim 18 wherein said cellular telephone is adapted to receive email.

23. The cellular security system of claim 22 further comprising a photo-resistor, said photo-resistor in electrical communication with said processing device, said photo-resistor adapted to detect when said cellular telephone receives an email and to indicate the reception of the email to said processing device.

24. The cellular security system of claim 23 wherein said display device is adapted to activate when said photo-resistor indicates the reception of the email to said processing device.

25. The cellular security system of claim 18 wherein said processing device is in communication with said cellular telephone by way of an electro-mechanical keypad interface.

26. The cellular security system of claim 18 wherein said processing device is in electrical communication with said cellular telephone.

* * * * *